(Specimens.)

C. POPP & L. MELCHIOR.
BUILDING BLOCK.

No. 344,594. Patented June 29, 1886.

WITNESSES:
Thos. Houghton.
P. B. Turpin.

INVENTOR:
C. Popp
L. Melchior
BY Munn & Co
ATTORNEYS.

BUILDING-BLOCK. 344,594

SPECIFICATION forming part of Letters Patent No. 344,594, dated June 29, 1886.

Application filed March 12, 1886. Serial No. 195,052. (Specimens.)

*To all whom it may concern:*

Be it known that we, CHRISTIAN POPP and LUDWIG MELCHIOR, citizens of the United States, residing at Wilmington, in the county of New Castle and State of Delaware, have invented an Improvement in Building-Blocks, of which the following is a specification.

Our invention is an improvement in building-blocks intended especially for inside work, and the invention consists in a building-block consisting of the several ingredients hereinafter named and prepared, substantially as will be described.

Figure 1:
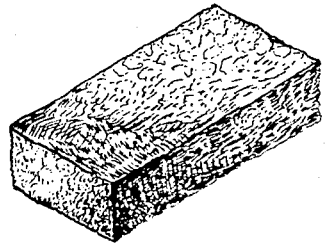
Figure 2:
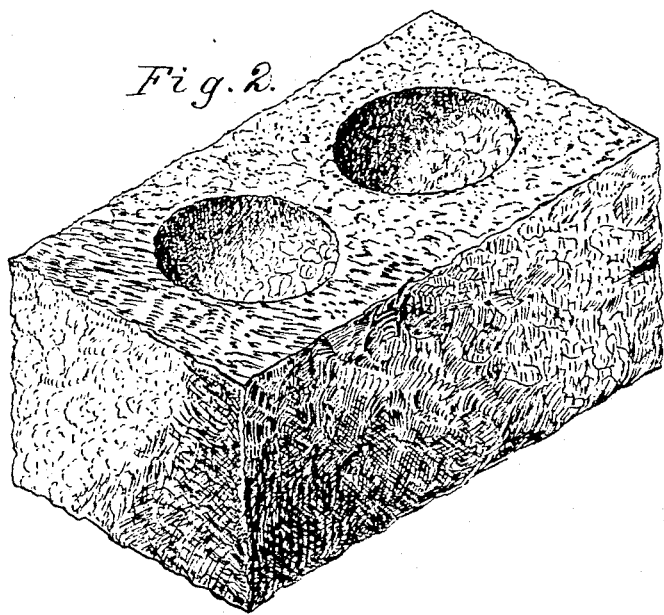

In the drawings, Figure 1 is a perspective view of one of the blocks in the form of a brick, and Fig. 2 is a perspective view of the block formed for use as a section of a flue.

In forming the bricks we use the following ingredients in substantially the proportions stated: Ground cinders and ashes, one and one-half bushel; dry slaked lime, twelve pounds; boiled glue, one pound; beach-sand, two quarts; plaster-of-paris, one quart; Portland cement, two quarts.

In use the cinders and ashes are, when they need it, ground or crushed, and then sifted, so the particles may be of about equal size. The lime is dry slaked in the usual manner and is used while hot. We boil the glue with enough water to render it plastic, and it should be noted that as little water is used as possible, in order to prevent the mass when mixed from being too wet. The elements above-named, together with the sand, plaster-of-paris, and cement are now mixed, sufficient water being added to enable the composition to be molded into the desired shape or shapes.

The quantities above specified, it is estimated, will make twenty-five (25) bricks of dimensions eight and one-half inches by four and one-fourth inches by two and one-fourth inches.

After the bricks have been molded into the desired shape or during such operation they are submitted to a heavy pressure, probably fifty pounds to the square inch, by which all surplus water is pressed out and the elements of the block are compressed into close relation. They are then dried, preferably in the open air.

Our blocks are intended especially for inside work—such as partitions, flues, &c., and they may also be used for backings for pressed brick walls and for other purposes, as will be described. When used for outside work, the brick should be coated or faced with cement or other mutable covering to hide the roughness of their surfaces. While the blocks may be used for backing of pressed brick fronts, and be formed, as shown in Fig. 2, for use as flues, they are especially desirable for inside partitions in place of studding or common brick walls. They are especially desirable for such purpose for the following reasons: They will dry quickly, and will, when dried, form practically a water and fire tight partition. Over such a partition a white coat may be laid directly without the use of a first coat, and will dry in a very short time. Into such a partition a nail may be readily driven, and the partition will not crack or break out as when nails are driven into plastering.

Another and important advantage of our bricks over the common bricks is that they are much lighter, so that a wall built thereof will be from one-half to one-third lighter than an ordinary wall.

A partition formed as described cannot be penetrated by mice or vermin because of its mechanical composition, and for the further reason that the admixture of glue and lime results in an offensive lye, which render the bricks so offensive to such pests that they will not attack them.

When united by a small quantity of common mortar, two of our blocks are almost inseparable, for the reason that the moisture in the mortar, acting on the glue in the two blocks, combines with such substance to increase the adhering property of the mortar.

When intended for use as a backing for pressed-brick fronts, or in other relations where they are intended to sustain weight or resist great strain, it is preferred to use for the cinders the hard stony cinders including what are generally known as "clinkers," while for use as inside partitions and for similar purposes, soft cinders, the crumblings of coke, fine ashes, and the cinders of locomotives are preferred.

When it is desired to provide a block of increased strength, we increase the proportions of all the ingredients, excepting the cinders.

Now, it will be understood that we might omit the plaster-of-paris by increasing the quantity of the cement; but we prefer to use such element because it causes the composition to set quickly.

It may be stated that in applying the white coat to bricks constructed according to our invention it will, because of the roughness of the surface, adhere strongly to the bricks, and but a thin coat will be necessary; also, that the bricks will absorb but little if any moisture, so that the coat will dry from the outside and very quickly.

Under the term "sand" we desire to include crushed brick, which latter may be used as a substitute for the beach-sand.

By using crushed brick all old bricks, brickbats, &c., may be disposed of and utilized.

Having thus fully described our invention, what we claim as new, and wish to secure by Letters Patent, is—

1. A building-block comprising, in combination, cinders, lime, and glue, substantially as set forth.

2. The improved building-block herein described, consisting of cinders, lime, glue, sand, plaster-of-paris, and cement, in about the proportions stated.

CHRISTIAN POPP.
LUDWIG MELCHIOR.

Witnesses:
JAMES R. LANDON.
ISAAC DILLIN.